United States Patent
Imam

(10) Patent No.: US 6,955,022 B2
(45) Date of Patent: Oct. 18, 2005

(54) FIXING MEANS FOR FIXING A SCREEN PANEL ON A SUPPORT STRUCTURE

(75) Inventor: Syed Yavar Imam, Kolkata (IN)

(73) Assignee: Tega Industries Limited, Kolkata (IN)

( * ) Notice: Subject to any disclaimer, the term of this patent is extended or adjusted under 35 U.S.C. 154(b) by 78 days.

(21) Appl. No.: 10/397,416

(22) Filed: Mar. 27, 2003

(65) Prior Publication Data

US 2004/0074194 A1 Apr. 22, 2004

(30) Foreign Application Priority Data

Mar. 27, 2002 (IN) ........................................ 176/Cal/2002

(51) Int. Cl.⁷ ................................................ E04C 2/42
(52) U.S. Cl. ...................... 52/660; 52/656.7; 52/655.2; 411/180; 411/508
(58) Field of Search ................................ 52/660, 656.7, 52/656.9, 655.1, 656.8, 203, 656.2, 656.5, 655.2; 411/180, 182, 508, 509, 510, 913; 160/57, 395; 49/492.1

(56) References Cited

U.S. PATENT DOCUMENTS

| | | | |
|---|---|---|---|
| 1,581,206 A | | 4/1926 | Charles et al. |
| 1,647,783 A | | 11/1927 | Carr |
| 1,705,455 A | * | 3/1929 | Griffiths ..................... 49/492.1 |
| 2,269,522 A | * | 1/1942 | Dreibuss et al. .............. 52/660 |
| 2,946,612 A | * | 7/1960 | Ahlgren ........................ 292/17 |
| 3,031,049 A | | 4/1962 | Somville |
| 3,136,350 A | * | 6/1964 | Rapata ........................ 411/182 |
| 3,234,612 A | * | 2/1966 | Raymond ................... 411/352 |
| 4,164,105 A | * | 8/1979 | Herbst et al. ................. 52/202 |
| 4,189,880 A | * | 2/1980 | Ballin ........................... 52/202 |
| 4,341,255 A | * | 7/1982 | Mock ........................... 160/369 |
| 4,596,503 A | | 6/1986 | Mirsberger et al. |
| 4,624,585 A | * | 11/1986 | Nix et al. ................... 384/296 |
| 4,690,192 A | * | 9/1987 | Stilling ......................... 160/57 |
| 4,984,798 A | | 1/1991 | Silberstein |
| 5,036,674 A | * | 8/1991 | Chang ............................ 62/77 |
| 5,379,912 A | * | 1/1995 | Wolf ........................... 220/481 |
| 5,580,204 A | * | 12/1996 | Hultman ..................... 411/509 |

FOREIGN PATENT DOCUMENTS

DE 198 49 821 3/2000

* cited by examiner

Primary Examiner—Basil Katcheves
(74) Attorney, Agent, or Firm—Venable LLP; Robert Kinberg; Catherine M. Voorhees

(57) ABSTRACT

A fixing means for fixing a screen panel on a support structure includes an insert member adapted to fit into a bore formed on the underside of a corner of a screen panel. The insert member has a first upper curved surface forming the major part of the insert member and having a uniform curvature of substantially more than a semi-circle, a second intermediate cylindrical grooved portion that is contiguous with the lowermost end of the first curved portion and is considerably smaller in cross-section compared to the upper curved portion, a third lower straight cylindrical surface which is a straight cylindrical portion contiguous with the second groove portion and is smaller in cross-section compared to the major top curved first portion, and a fourth straight substantially horizontal surface. The insert member has an inner vertical bore of suitable dimension to accommodate a holding means such as a bolt, a screw, or other equivalent to fixedly hold the insert onto a panel support member.

8 Claims, 4 Drawing Sheets

FIXING MEANS FOR FIXING A SCREEN PANEL ON A SUPPORT STRUCTURE

INTRODUCTION TO THE FIELD OF INVENTION

This invention relates to improved screen panels and fixing arrangement therefor.

PRIOR ART AND DRAWBACKS

Screen panels are well known in screening arrangements.

Also well known are fixing arrangement for fixing the screens to the support frame.

Various designs and constructions of both screen panels and fixing arrangements are in use throughout the World for several years.

Generally, in one such screen panel, there are provided a pair of semi-circular or half through cavities on its sides so that the next panel of similar type can be aligned to form a full cavity, which is used to fix the panel through bolt and nut to the support frame.

It is also well known that over a period of use, the screen panels get damaged or clogged or otherwise their functional efficiency is impaired. This requires stopping the operation or interrupting the screening and removing the impaired screen panel for replacement service etc. The operation is time consuming and this means that the panel has to be freed from all sides by removing the fixing means and the replacement is again to be proceeded with by fixing along the sides of the panel.

This is time consuming, labour intensive and careful monitoring is required for proper alignment. Moreover, every replacement means the fixing means are also to be taken out and re-fixed. Sometimes, the damaged ones are to be replaced. All this increases the inventory also.

In another known type of construction, the fixing means is in the form of a series of protrusions in the screen panels itself dependent from the frame and all these protrusions are to be integrally formed on the underside of the panel frame, which is a drawback. Further, it requires great skill to properly align these protrusions to match the holes or openings in the support frame.

A further drawback is that these protrusions are intended to tightly hold the screen panel to the support frame, but there is danger of these becoming lose on long use thereby affecting the efficiency of same. Further the manufacturing of the screen panels with integrating fixing means increases the cost of production and engineering requirements.

In yet another fixing means, adjacent sides of the screen panels are provided with specially designed and formed locking arrangement and these are adopted to receive a common matching formed insert having complementary provisions to hold the two ends of adjacent screen, one on either side. These are supported on the support structure with the insert in the hole. However, to hold the screen tightly on the support sure, a third element is required which has specially formed outer depending unit matching the inner complementary shape of the insert.

These together form the fixing means

However, these increase the cost of manufacture, calls for precision engineering and it is not possible to remove or replace any desired damaged screen panel. The whole fixing unit is to be first removed and the required panels replaced and again re-fixed.

There are a few other fixing means for screen panels, which have one or another drawback and to the applicant's knowledge, there is no fixing means, by which one can remove any screen panel for repair or replacement.

We are also aware of the following prior-art patents:

1. U.S. Pat. No. 4,596,503:

This Patent refers to an expansion dowel assembly having an axially extending sleeve and a spreading element and having tongues pivotally displaceably connected to the sleeve and located one after the other along the axial direction of the sleeve.

This construction is entirely different from the applicant's invention in terms of basic principle and is not suited for the purpose of applicant's objectives.

It is totally irrelevant.

2. German Patent DE 19849821 A:

This discloses an insert member having collapsible wing like portions (element 14 in the drawing). The insert has grooves 9 and 4 at 90°. The insert is to be pushed through are sent of grooves when the wing portions fold along the surface of the cylindrical outer surface and then it is twisted so that the wings are released and get locked the two grooves 9 and 4 are accordingly formed with precision. At the termination of the group 9, starts groove 4.

This is also a totally different article and has nothing to do with the applicant's invention.

3. U.S. Pat. No. 3,031,049:

This Patent pertains to a fastening device for metal constructions for fastening together elements thereof or for fastening separate parts or accessories into the metal construction. If recommends, the use of frames, ribs and fillets and especially formed fastening element.

As the name suggests, it is a fastening device for metal construction, whereas, the applicant's invention is for fastening device between a metal and a non-metallic construction in a vibrating structure.

The Patent has nothing in common with the applicant's invention and is not suitable for the purposes for which the applicant's invention is concerned with.

4. U.S. Pat. No. 5,379,912:

This Patent is also irrelevant to applicant's invention in that it relates to an arrangement for connecting a cover panel for an electrical while the body structure of a vehicle using locking bolts etc.

5. U.S. Pat. No. 1,647,783:

This Patent is nearly 80 years old, filed in 1924. The screen panel and fixing arrangement of the instant invention can not be even margined from this very old document. This U.S. patent is entirely different in that it refers to a non-resilient headed fastener having a neck and casting and an attaching member.

6. A more or less similar construction is disclosed in another 80 years old U.S. Pat. No. 1,581,206 also filed in Dec. 1924.

7. U.S. Pat. No. 4,984,798:

In this Patent, there is disclosed an assembly and a display device for the playing pieces of a two sided puzzle. There are spring mechanisms and side walls on two complimentary sheets which is entirely different from applicant's invention.

The applicant's invention differs basically from all the prior art known and discussed above in that the applicant is concerned with a fastening device in a vibrating structure contrary to static bodies of the prior art. More over in the applicant's construction a metallic and a nonmetallic bodies are used

OBJECT OF THE INVENTION

It is therefore a primary object of this invention to propose a simple fixing means for screen panel, which can be easily mounted and dismounted.

It is another object to propose such a fixing means, which can be precision made and can be easily maintained.

It is a further object, such that the fixing means can last longer without getting affected frequently.

It is a further object, such that the fixing screens is not subjected to lot of wear and tear.

It is yet another object to propose such a fixing means, which will facilitate independent and individual lifting and dismantling of any screen panel, which requires replacement.

It is an yet another object to propose a fixing means, which can be made of wide variety of materials, which can be selected from metal, rubber, synthetic resins and reinforced materials and can be precision made.

It is a further object to propose a novel screen panel for use with the novel screen fixing means with the advantage of more screening area, less wear and tear, less replacement and individual replacements.

These and other object will be clear from the following paragraphs.

BRIEF STATEMENT OF THE INVENTION

According to this invention there is provided a fixing means for fixing a screen panel on a support structure comprising an insert member adopted to fit into a bore formed on the underside of corner of a screen panel, said insert having principally the following geometries:
  a. a first upper curved surface forming the major part of the insert and having a uniform curvature of substantially more than a semicircle.
  b. a second intermediate cylindrical grooved portion, being contiguous with the lowermost end of the first curved portion and being considerably smaller in cross section compared to the upper curved portion.
  c. a third lower straight cylindrical surface which is a straight cylindrical portion contiguous with the said second groove portion and being is smaller in cross section compared to the major top curved first portion.
  d. a fourth straight substantially horizontal surface and
  e. said insert having an inner vertical bore of suitable dimension to accommodate a holding means such as a bolt, a screw or other equivalent to fixedly hold the insert onto a panel support member.

In the assembled condition,
  a. the said second groove portion simply fits onto a suitably formed inner ring portion in the insert and
  b. the third lower cylindrical portion, when assembled, snugly rests along side the said third portion namely cylindrical portion of the insert.

There is also provided a screen panel adopted to be mounted on a screen support and held to the same comprising a screen panel having vertical bores on the underside at predetermined locations adopted to receive a screen fixing means disclosed earlier.

The screen panel has the further features as follows:
  i. The bore on the underside of the screen is preferably formed on the four corners, one at each corner.
  ii. the said bore has preferably five geometries as follows:
     a. a first upper straight closed circular portion
     b. a second lower cylindrical portion depending from the said first portion
     c. a third inner cylindrical ring portion contiguous with the said second portion
     d. a fourth lower straight cylindrical portion contiguous with the said ring portion
     e. a last substantially open circular portion
     f. a said second portion, namely the straight cylindrical portion being substantially bigger in height than the said fourth straight cylindrical portion.

When assembled, the outer surface of the said curved portion of the insert and the upper inner end of the bore provide an annular space between the same. The top said second cylindrical portion and the fourth cylindrical portion are in the same vertical plane.

In a modification of the screen, the bore is fitted with a bolt and the insert is arranged on the support structure.

Similarly in a modification of the fixing means the insert is accommodated on the support structure to simply fit a bolt fixed in the bore of the panel member.

BRIEF DESCRIPTION OF THE ACCOMPANYING DRAWINGS

Figure 1:
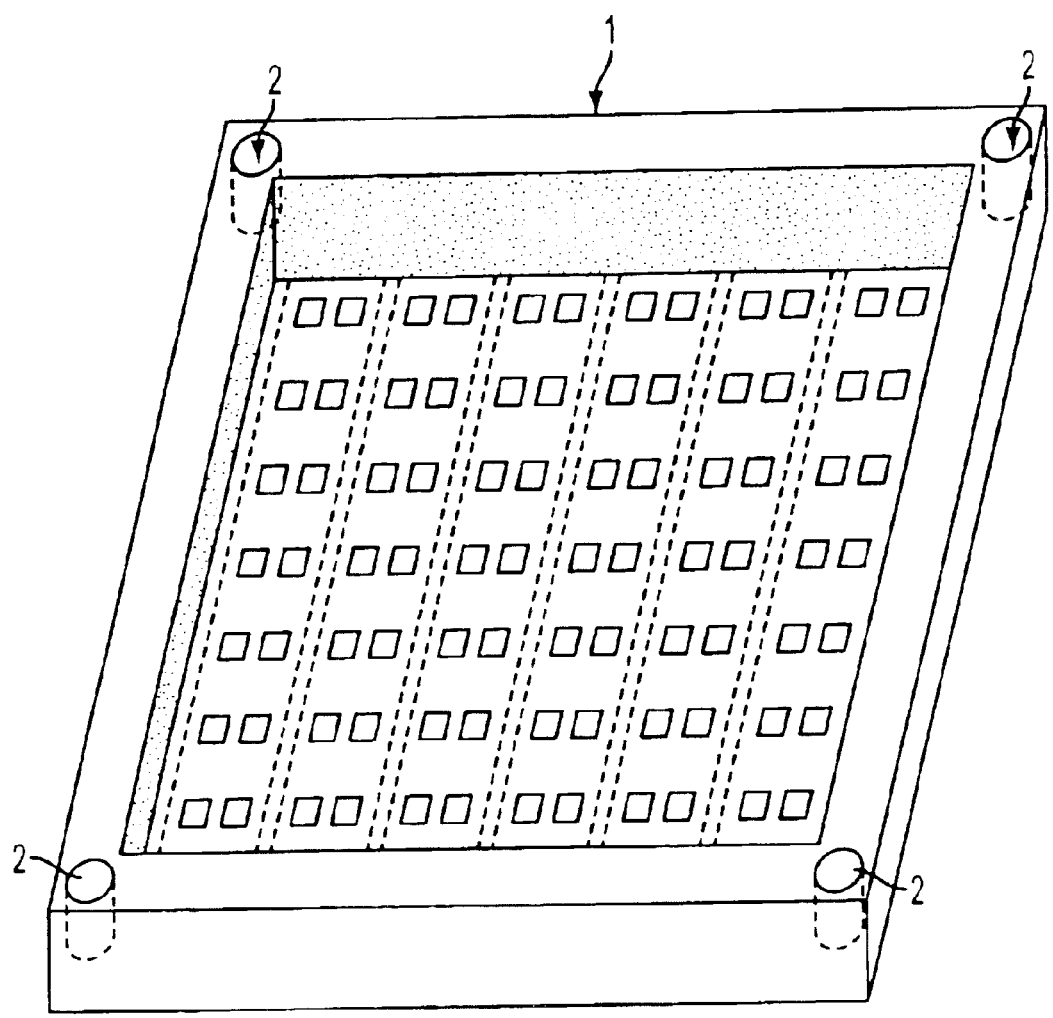
FIG. 1 shows schematically the bottom view of a screen panel according to this invention.
Figure 2:
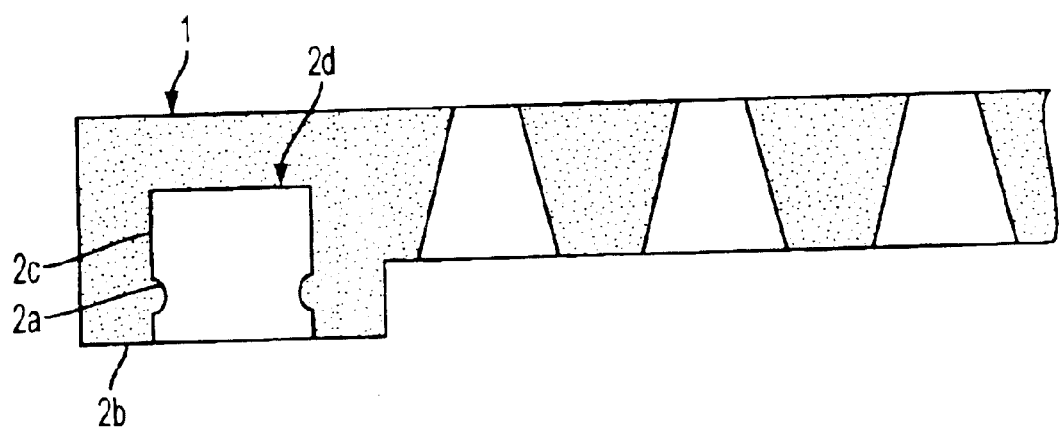
FIG. 2 shows a section of a part of the panel.

It will be seen from FIG. 1 that the screen panel (1) has been provided with suitable bore holes (2) at the bottom from corners of suitable dimension and shape. The bore hole, as will be seen, has an internally extending integrally formed ring member (2a).

The bore hole has straight cylindrical walls (2b and 2c) above and below the internal ring (2a).

The top portion (2d) of the bore hole is preferably flat and straight to serve the purposes of the invention.

Furthermore, the upper cylindrical portion (2c) is longer than the lower cylindrical portion (2b), which is also specially designed for the purposes of the invention.

The fixing means is a plug member or insert 3 made of any suitable material for the purposes of the invention.

The insert 3 has four different geometries as follows:

The upper portion (4a) is of a curved nature having a predetermined radius of curvature to sit within the upper cylindrical portion of the bore.

It is important to note that this is not a snugly fitting plug so far as the top curved portion is concerned.

Figure 3:
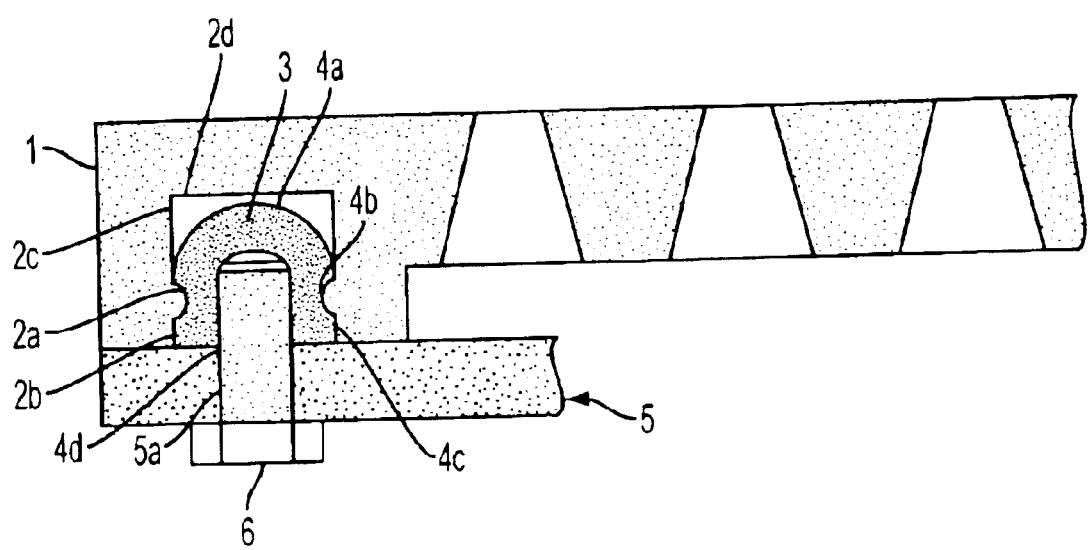
FIG. 3 shows a screen member fixed on a pair of support members.
Figure 4:
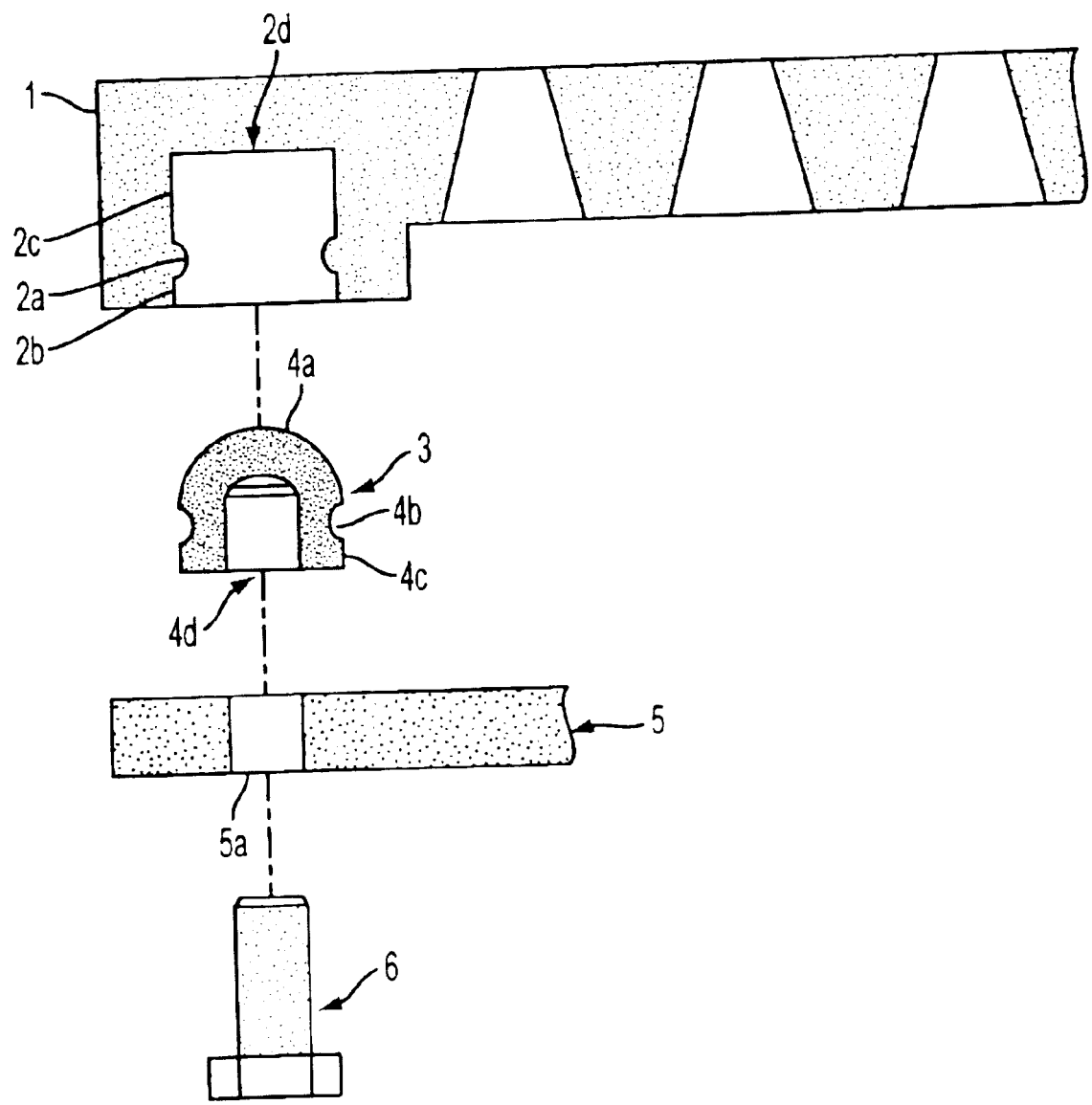
FIG. 4 shows an exploded view of FIG. 3.

It will be clearly seen from FIG. 3 that above the internal ring portion, there is an annular gap formed between the outer surface of the curved portion of the insert and inner surface of the upper cylindrical part of the bore.

This is also specially formed for the purposes of the invention.

The insert has a second geometry in the form of a cylindrical groove 4b to match the inner ring of the bore when assembled.

Below the cylindrical groove, the insert has a straight cylindrical portion 4c which is formed to match the lower cylindrical inner portion of the bore.

These dimensions are to be very judiciously selected and formed with meticulous care.

The fourth geometry of the insert is a straight surface 4d to lie flush with the under surface of the panel.

The fixing means further includes the support structure 5 on which the insert is fixed through a bolt, preferably a hexagonal bolt. For the purpose, the insert itself is provided with a suitable hexagonal bore 5a.

The bore and the bolt can also replaced by screwing arrangement.

It will thus be appreciated that the whole arrangement is simple and convenient.

THE OPERATION IS AS FOLLOW

The screen panel is provided with preferably four bore holes at the lower surface at the four corners of the same formed meticulously to the required measures.

If desired, more such bores can be formed on the bottom sides but it is not necessary.

This has greatly helped us to retain all the screening surface of the screen panel and thus more operational area is available to us. This has a positive significant effect on the efficiency of operation, rate of load handled, total load screened, power consumption, labour cost and also on wear and tear.

The suitably formed inserts are fixed on the frame and the underside of the screen panel is brought in alignment of the inserts and the bores.

By simply pressing the panel on these inserts carefully and evenly in horizontal manner, the panel gets snap fitted on the support.

There is no plug during operation.

It has also given us the advantage of forming more screening area along the four sides of the panel because we have made use of only the undersides of the four corners of the panel. A number of panels can thus be easily fitted.

When it is desired to remove a panel, it is simply necessary to prise out a free side of the panel and it comes out easily and effortlessly.

There is no need to interfere with the fixing elements at all.

Further, the replacement can be carried out even during the operation of the screen and this is possible for inexperienced hand.

Thus, the down time is also minimized and can be eliminated.

In another embodiment, the bolt can be fixed into the bore and the insert fixed to the support structure so that the same snap action can be carried out easily even by inexperienced hand.

I claim:

1. A screen panel in combination with a screen fixing means where the screen panel is mounted on a screen support and held to the same and comprises vertical bores provided on the underside of the screen panel at predetermined locations that receives the screen fixing means, said fixing means comprising an insert member fitted into a vertical bore formed on the underside of corner of the screen panel, said insert member having principally the following geometries:
   a. a first upper curved surface portion forming a major part of the insert member and having a uniform curvature of substantially more than a semi-circle;
   b. a second intermediate cylindrical grooved portion, being contiguous with a lowermost end of the first curved surface portion and being considerably smaller in cross section compared to the upper curved surface portion;
   c. a third lower straight cylindrical surface which is a straight cylindrical portion contiguous with the said second grooved portion and being smaller in cross section compared to the first upper curve surface portion;
   d. a fourth lower straight substantially horizontal surface; and
   e. said insert member having an inner vertical bore of suitable dimension to accommodate a holding means to fixedly hold the insert member onto the screen panel support.

2. The screen panel in combination with a screen fixing means as claimed in claim 1 wherein, when assembled,
   a. the said second grooved portion simply fits onto a suitably formed inner ring portion of a vertical bore and
   b. the third lower cylindrical portion, when assembled, snugly rests along side a lower cylindrical portion of the vertical bore.

3. A screen panel in combination with a screen fixing means as claimed in claim 1, wherein, a vertical bore is form on the underside of the screen panel at each of the four corners of the screen panel.

4. A screen panel in combination with a screen fixing means as claimed in claim 1, wherein, the said vertical bore has five geometries as follows:
   a. a first upper straight closed circular portion;
   b. a second lower cylindrical portion depending from the said first portion;
   c. a third inner cylindrical ring portion contiguous with the said second portion;
   d. a fourth lower straight cylindrical portion contiguous with the said ring portion;
   e. a last substantially open circular portion; and
   f. said second portion, namely the straight cylindrical portion being substantially bigger in height than the said fourth straight cylindrical portion.

5. A screen panel in combination with a screen fixing means as claimed in claim 4, wherein, when assembled, the outer surface of the said first upper curved portion surface of the insert and the upper inner end of the bore provide an annular space between the same; the top of said second cylindrical portion and the fourth cylindrical portion being in the same vertical plane.

6. A screen panel in combination with a screen fixing means as claimed in claim 1, wherein the holding means is a bolt and a the inner vertical bore is fitted with the bolt and the insert member is arranged on the screen support.

7. The screen panel in combination with a screen fixing means as claimed in claim 1, wherein the insert member is accommodated on the screen support to simply fit a bolt fixed in the bore of the screen panel.

8. The screen panel in combination with a screen fixing means, as claimed in claim 1, wherein the holding means comprises one of a bolt or screw.

* * * * *